Sept. 15, 1964  R. A. MARVIN  3,148,458
FLIGHT TRAINING OR SIMULATING APPARATUS
Filed Nov. 8, 1961
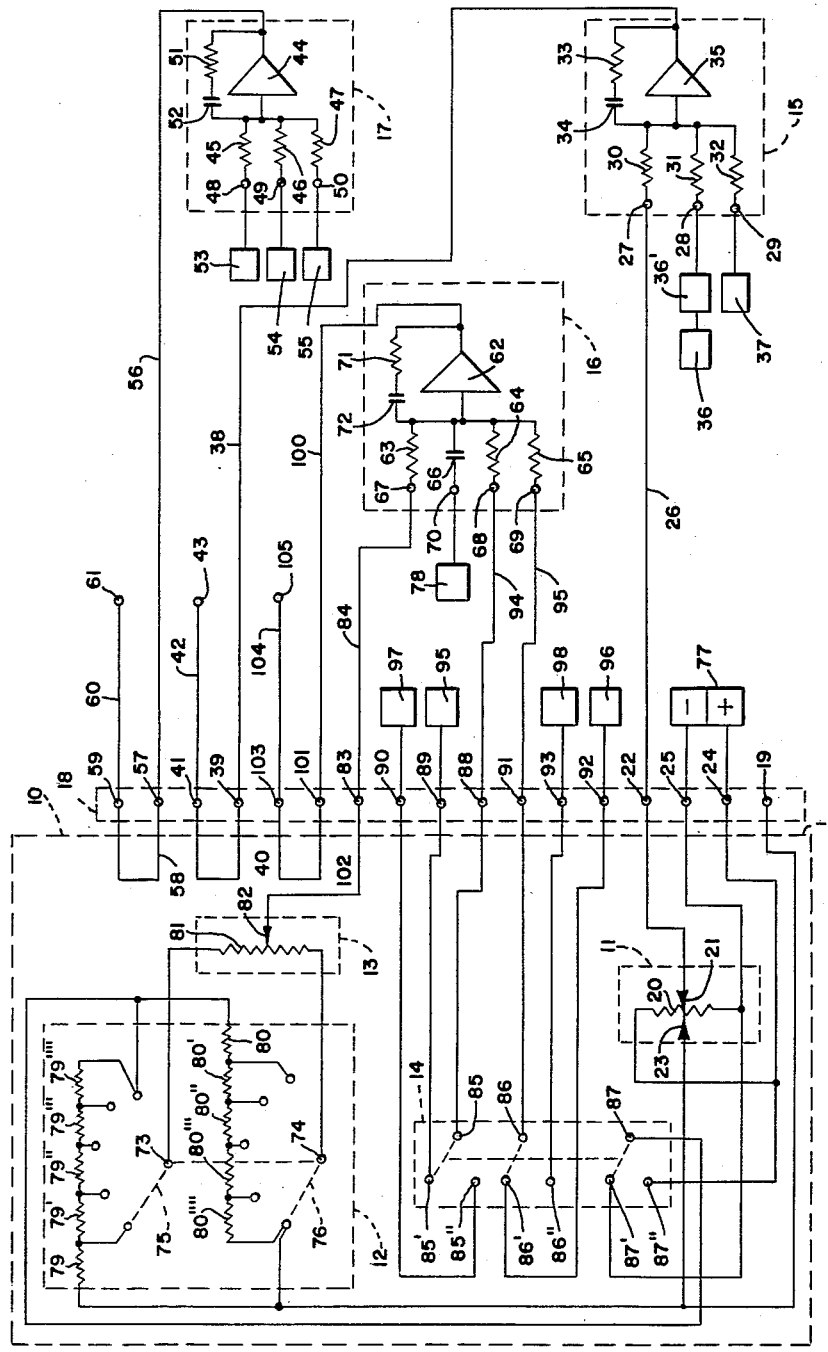
INVENTOR
RONALD A. MARVIN
BY *Larson and Taylor*
ATTORNEYS 3,148,458
FLIGHT TRAINING OR SIMULATING APPARATUS
Ronald Arthur Marvin, Horsham, England, assignor to Communications Patents Limited, London, England
Filed Nov. 8, 1961, Ser. No. 150,963
Claims priority, application Great Britain Nov. 23, 1960
6 Claims. (Cl. 35—12)

This invention relates to flight training or simulating apparatus and particularly to auxiliary equipment for use with such flight training or simulating apparatus to simplify maintenance and adjustment thereof.

It is often necessary to hold steady state conditions in the computing system of an electronic flight simulator, so that constant conditions of altitude, attitude and airspeed are maintained during adjustment or maintenance operations. Such steady state conditions can be achieved by manually operating the simulator in the required manner. However, a human operator cannot hold stable conditions as satisfactorily as automatic equipment.

In electronic flight simulators using computers actuated by alternating current signals, it is usual for integrations to be effected by means of velodyne servo-mechanisms. In such cases, the servo-mechanisms may be provided with switches so that the power supply to the servo motors can be disconnected. This locks the servos so as to maintain the previously given set of conditions indefinitely. However, this method is inconvenient if the servo-mechanisms are situated in different parts of the computer.

In cases where the computers are actuated by direct current signals and where electronic integrators are employed, other methods of maintaining constant conditions must be used, as such integrators cannot be locked at a given value by simple switching means.

It is an object of the present invention to provide test equipment, for association with an electronic flight simulator or trainer, to enable simulated conditions of flight, such as constant altitude, constant airspeed or a given attitude, to be maintained for any desired period of time.

According to the present invention, apparatus for use in or in conjunction with an electronic flight trainer or simulator, comprises computing means separate from the computing means of the flight trainer or simulator, from which signal outputs are derived for feeding to electronic computer means forming a part of the said flight trainer or simulator, and means for providing adjustably variable electrical inputs to the separate computing means of the said apparatus whereby simulated conditions of aircraft attitude, altitude and airspeed can be maintained in the trainer or simulator during a prolonged period of time. Once established, said maintained conditions will be independent of the subsequent setting of the flying controls of the trainer or simulator, except for transient effects.

In order that the invention may be more readily understood, an embodiment thereof will now be described by way of example, with reference to the accompanying drawing, the sole figure of which shows, in diagrammatic form, auxiliary test apparatus for use with an electronic flight simulator to enable a range of pitch and roll conditions to be maintained in the simulator.

The test apparatus consists of a selector box and three computing units. The computing units are permanently installed in the computing section of the flight simulator, as a matter of convenience. In the computer of the simulator, aerodynamic performance is determined by well-known methods, using electric signals representing forward, side and lift forces, and pitching, yawing and rolling moments.

The selector box is provided with controls to enable values of pitch and roll to be set up manually, so that required conditions of altitude, attitude and airspeed can be established in the simulator. The circuit arrangements are such that control of the simulator is taken over automatically by the test apparatus when the selector box is plugged into position.

Referring to the diagram, a selector box represented by the broken line 10, includes a roll control 11, coarse and fine pitch controls 12 and 13 respectively, and a two-position "altitude lock/speed lock" switch 14. The controls 11, 12 and 13 are manually adjustable. Three computing units 15, 16 and 17 are installed in the computing section of an associated flight simulator. The computing elements in the computer of the simulator, directly concerned with the operation of the test apparatus, are also shown in the diagram and these are referred to later in the specification. The circuits of the selector box, the computing units and computing elements of the flight simulator are joined together by a multi-way plug and socket connector 18. For the sake of simplicity, it is assumed that point 19 of the connector block 18 is used as a common return.

The roll control 11 is a potentiometer, having a winding 20, centre tapped at point 23. The winding 20 is supplied with direct current from a source of potential 77, the positive and negative poles of which are connected respectively to terminals 24 and 25 of the connector block 18. A wiper 21 of the potentiometer is connected to terminal 22 of the connector 18. From the wiper, a signal is passed, via line 26, to an input terminal 27 of the computing unit 15. The magnitude and sign of the signal at the input 27 is determined by the position of the wiper 21 with respect to the centre tap and corresponds to the magnitude and direction of the roll angle set in by adjustment of the control 11.

Maximum positive and negative roll angles are produced in the simulator when the wiper 21 is at either end of the winding, connected either to the positive or the negative pole of the source 77.

The computing unit 15 comprises a D.C. amplifier 35 and a summing network of three resistors 30, 31 and 32, connected respectively to input terminals 27, 28 and 29. Amplifier feedback is provided by a resistor 33 and a capacitor 34 connected in series from the output to the input of the amplifier 35.

The inputs supplied to terminals 27, 28 and 29 consist respectively of command, monitoring and stabilising feedback signals. The command signal, obtained from the roll control 11, is answered by the monitoring signal. The monitoring signal is proportional to $\cos \theta \sin \phi$ and is obtained from computing elements 36 and 36', forming parts of the computer of the simulator. The quantity $\theta$ is the pitch angle and $\phi$ is the roll angle. The stabilising input, in the form of a rate of roll signal, is obtained from a computing element 37 also forming a part of the computer of the simulator.

The values of the resistors 30, 31 and 32 are chosen so that the three signals applied to the input of the amplifier 35 have the correct relative magnitudes.

The value of the capacitor 34 is chosen so that the amplifier 35 behaves as an integrator for any computed signal occurring at the amplifier input. For high frequencies affecting the amplifier 35, where the network is resistive, the gain of the amplifier is limited to a value consistent with stability.

The output of the computing unit 15 is used as a rolling moment signal and is fed, via lines 38 and 42, to an input terminal 43 of a roll angle computing system, forming a part of the simulator. In the simulator, this signal is summed with any rolling moment signal input which is present if the aileron control is not at a neutral setting.

The lines 38 and 42 are joined together in the selector box 10 by a link 40 between terminals 39 and 41 of the connector 18.

Rolling, pitching and yawing moment signals are derived in the simulator from circuit elements associated with the aileron, elevator and rudder flying controls. From these signals, angular rates and angular displacements are derived by double integration, in roll, pitch and yaw angle computing systems. The computing element 37 which provides the rate of roll stabilising signal fed to terminal 29 is therefore associated with the rate of roll integrator. The computing elements 36 and 36′ which provide the $\cos \theta \sin \phi$ monitoring signal fed to terminal 28, are associated respectively with the angle of pitch and the angle of roll integrators.

The monitoring signal fed to terminal 28 includes pitch and roll terms in order that correct control of the simulator may be maintained when the simulated aircraft is returned to a position of normal keel, after the pitch and roll angles have both turned through 180°. Such a condition is produced for example when a half roll, half loop manoeuvre is carried out. Correct control is maintained because the sign of the term $\cos \theta \sin \phi$ is, for similar pitch and roll angles, the same in both conditions. The polarity of the signal at terminal 28 corresponds to the sign of the term $\cos \theta \sin \phi$. When the pitch angle is zero, the term $\cos \theta$ is equal to unity and the monitoring signal corresponds to $\sin \phi$.

The roll angle is determined in the computer of the simulator by a system using first and second integrators. A signal representing angular velocity is produced from a signal representing angular acceleration, by the first integrator, and a signal representing angular displacement is produced from the angular velocity signal output of the first integrator, by the second integrator.

The acceleration signal may be derived from a moment signal, which is obtained from a circuit element associated with the aileron control or from the potentiometer 20 in the selector box.

When the simulator is operated in the normal manner, the aileron control of the simulator is manipulated to produce and hold a given roll angle. In the process, the acceleration and velocity signal inputs to the first and second integrators of the roll angle computing system are reduced to zero when the desired roll angle is attained.

When the test apparatus is in use, the acceleration signal to the first integrator is derived from the selector box control 11. In the computing unit 15, the command signal, fed to terminal 27, is opposed by the monitoring signal, fed to terminal 28. Hence the input to the amplifier 35, due to these signals, is reduced to zero in the computing process, when the roll angle reaches a value to make the monitoring signal correspond to $\sin \phi$. The polarity of the stabilising signal is such that any periodic changes of roll angle which occur in the roll angle system are damped out. Thus, the stabilising input is also reduced to zero in the computing process and the inputs to the first and second integrators become zero when the roll system takes up a stable position.

When a steady acceleration signal input is present at the input of the first integrator, for example as a result of lack of aileron trim, an equal and opposite signal is produced, by integrating action, at the output of the amplifier 35 to offset this steady signal input. In the computing process, the signal inputs to the first and second integrators are returned to zero, as before, when the roll angle reaches a value to make the monitoring signal correspond to $\sin \phi$.

Thus, a roll condition set in by means of the control 11 of the selector box causes a moment signal to be fed into the roll system of the simulator so as to maintain the roll angle at the desired value.

In an actual aircraft, the rudder control is normally used to inhibit sideslip. The computing unit 17 is thus used to provide a moment signal in the yaw angle computing system of the simulator which will satisfy this condition. No command signal input is supplied to the computing unit 17 from the selector box 10.

The computing unit 17 comprises a D.C. amplifier 44 and a summing network of three resistors 45, 46 and 47 connected respectively to input terminals 48, 49 and 50. The values of the resistors 45, 46 and 47 are chosen so that the inputs have the correct relative amplitude at the input of the amplifier 44. Amplifier feedback is provided by a resistor 51 and a capacitor 52, as in the case of the computing unit 15.

Signals from the computor of the simulator are fed to the input terminals 48, 49 and 50 of the amplifier 44. The signal fed to terminal 49, corresponding to rate of yaw, is obtained from a computing element 54 associated with the yaw angle computing system. The signals fed to terminals 48 and 50 are obtained respectively from computing elements 53 and 55 of a sideslip angle computing system in the computer of the simulator.

The signal fed to terminal 48 corresponds to sideslip angle. The signals fed to terminals 49 and 50, when summed, correspond to rate of change of sideslip angle and are of such polarity that periodic changes of sideslip angle are damped out in a manner to stabilize the system. In the simulator, the same signals are used as inputs to an integrator of the sideslip angle computing system.

The output of the computing unit 17 is a yawing moment signal. This signal is fed via lines 56 and 60 to an input terminal 61 of the yaw computing system of the simulator. The lines 56 and 60 are joined together in the selector box 10 by a link 58 between terminals 57 and 59 of the connector 18. In the computer of the simulator, the yawing moment signal is summed with any signal input derived from the simulator's rudder controls. The polarity of this signal is such that the sideslip angle is reduced.

The combined system formed by the yaw angle computing system in the computer of the simulator and the computing unit 17, is similar to that formed by the roll angle computing system and the computing unit 15. The signal input fed to terminal 48 corresponds to that formed by the combined signals fed to terminals 27 and 28. The combined signal inputs fed to terminals 49 and 50 correspond to that fed to terminal 29. In this case, the presence of a signal input at terminal 48 causes the yaw angle to vary so as to reduce the sideslip angle and, in turn, the signal input at terminal 48 to be reduced to zero. Any steady acceleration signal input fed in from the rudder circuit to the input of the first integrator of the yaw angle system is offset by the integrated output signal of the amplifier 44. Thus, if sideslip occurs, a moment signal is introduced into the yaw system of the simulator in a sense to counteract the tendency to sideslip.

An aircraft may be controlled in pitch to maintain altitude at a pre-determined level when cruising, or to maintain airspeed at some pre-determined value when climbing or descending. When constant altitude is maintained, changes in flight conditions produce changes in airspeed. When constant airspeed is maintained, changes in flying conditions cause changes in the rate of climb or descent. In the simulator, altitude is derived from a signal which represents rate of climb. This signal includes terms corresponding to the sine of the pitch angle and to airspeed.

In the selector box 10, the switch 14 enables either constant altitude or constant airspeed conditions to be maintained in the simulator, by providing two different pairs of inputs to the computing unit 16.

The computing unit 16 comprises a D.C. amplifier 62 and a summing network of three resistors 63, 64 and 65 and a capacitor 66 connected respectively to input terminals 67, 68, 69 and 70. The values of the resistors 63, 64 and 65 and of the capacitor 66 are chosen so that the inputs have the correct relative amplitudes at the input of the amplifier 62. Amplifier feedback is provided by a resistor 71 and a capacitor 72 as in the case of the units 15 and 17.

The inputs to the amplifier 62 consist of a pitch command signal together with monitoring and stabilizing feedback terms.

The command signal fed to terminal 67 is obtained, via line 84, from the pitch controls 12 and 13. Coarse and fine controls are used to enable the pitch command signal to be set with accuracy. The coarse control 12 comprises two five-position switches 73 and 74, ganged together, and two groups of five resistors 79, 79', 79'', 79''', 79'''', and 80, 80', 80'', 80''', 80'''', connected to contacts of the switches 73 and 74 to form two tapped potentiometers. One end of each of the potentiometers so formed is connected to a source of D.C. potential, via a contact of the switch 14, and the other end of each of the potentiometers is connected to the common return joined to terminal 19. The resistors 79 and 80 are connected to contacts at opposite ends of the switches 73 and 74, so as to provide a difference of voltage between arms 75 and 76. To the arms 75 and 76 are connected the winding 81 of a potentiometer forming the fine control 13. A wiper 82 on the winding 81 is connected to terminal 83 of the connector 18. An output signal in one of five different voltage ranges can therefore be obtained by means of the fine control 13 according to the setting of the coarse control 12.

The value of the resistors 79, 79', 79'', 79''', 79'''' and 80, 80', 80'', 80''', 80'''' and of the potentiometer winding 81 are such that any voltage between zero and that existing across the potentiometers 73 and 74 is available at terminal 83.

The command input fed to terminal 67 is answered by a monitoring signal fed to terminal 68. This monitoring signal is obtained from the simulator via the selector unit 10 and is proportional to altitude or to airspeed, according to the position of the two-way switch 14.

The feedback input signal fed to terminal 69 is used to stabilize the system and is obtained from the simulator via the selector box 10. This signal corresponds either to longitudinal acceleration or to rate of climb, according to the position of the switch 14.

A further stabilizing input signal, corresponding to the sine of the pitch angle, is also fed to terminal 70 direct from a computing element of the pitch system of the simulator, which is represented by unit 78 in the diagram. This input is differentiated by means of the capacitor 66 to form a signal proportional to the rate of change of the sine of the pitch angle.

The switch 14 has three poles comprising contacts 85, 85', 85''; 86, 86', 86'' and 87, 87', 87''. The contacts 85, 85', 85'' and 86, 86', 86'' are connected respectively to terminals 88, 89, 90 and 91, 92, 93 of the terminal block 18. Terminals 88 and 91 are connected respectively to terminals 68 and 69 of the amplifier 62 via the lines 94 and 99. Contact 87 is connected to the potentiometers of the coarse control 12. Contacts 87'' and 87' are connected, via terminals 24 and 25 to the positive and negative poles respectively of the D.C. source 77.

With the switch 14 in the "altitude lock" position, the contacts 85, 86 and 87 are connected to contacts 85', 86', 87' respectively. A monitoring signal obtained from a computing element of the height system of the simulator, represented by unit 95 in the diagram, is fed to terminal 68 and a stabilizing signal obtained from another computing element of the height system of the simulator, represented by unit 96 in the diagram, is fed to terminal 69. A D.C. voltage of negative polarity is applied to the coarse control 12.

With the switch 14 in the "speed lock" position, the contacts 85, 86 and 87 are connected to 85'', 86'' and 87'' respectively. A monitoring signal obtained from a computing element of the airspeed system of the simulator, represented by unit 97 in the diagram, is fed to terminal 68. A stabilising signal proportional to forward acceleration, obtained from another computing element of the airspeed system of the simulator, represented by unit 98 in the diagram, is fed to terminal 69. A D.C. voltage of positive polarity is applied to the coarse control 12.

The output of the computing unit 16 is a pitching moment signal. This signal is fed, via lines 100 and 104, to an input terminal 105 of the pitch computing system of the simulator. The lines 100 and 104 are joined together in the selector box 10 by a link 102 between terminals 101 and 103 of the connector 18. The combined system formed by the pitch angle computing system of the simulator and the computing unit 16 is similar to that formed by the roll angle computing system and the computing unit 15. The command signal is offset by an equal and opposite monitoring signal when the desired condition of pitch angle has been achieved. Any steady acceleration signal fed in from the elevator circuit to the input of the first integrator of the pitch angle system is offset by a signal produced by integrating action at the output of the amplifier 16.

In the "altitude lock" position, the pitch controls 12 and 13 are fed from a source of negative potential. A signal voltage having an amplitude which is determined by the setting of the controls and which represents a given altitude, is fed to the computing unit 16. Thus, a pitch condition set in by means of the controls 12 and 13 causes a moment signal to be fed into the pitch system of the computer and the command signal to be opposed by a monitoring signal, so as to maintain the altitude at the desired value.

In the "speed lock" position, the controls 12 and 13 are fed from a source of positive potential and a signal voltage having an amplitude which is determined by the setting of these controls and which represents a given airspeed, is fed to the computing unit 16. The polarity of the voltage applied to the controls is reversed since a nose-down pitch manoeuvre is required to increase airspeed, whilst a nose-up pitch manoeuvre is required to decrease airspeed. Thus, a pitch condition set in by means of the controls 12 and 13 causes a moment signal to be fed into the pitch system of the computer and the command signal to be opposed by a monitoring signal, so as to maintain the airspeed at the desired value.

It is apparent from the foregoing that the flying controls of the simultor are still effective and that transient disturbances will occur if these controls are manipulated while the test equipment is in operation. In practice, complications of this kind are avoided by leaving the flying controls undisturbed when tests are being carried out. Alternatively, all moment signal inputs to the angle computing system, other than those from the units 15, 16, 17, may be temporarily removed.

The controls of the unit 10 are manipulated to establish the desired conditions of flight, using the instruments of the simulator for this purpose. Any steady residual moment signal inputs caused, for example, by lack of trim of the flying controls are taken into consideration and combined with the moment signals of the units 15, 16 and 17.

When the conditions of flight are determined by means of the instruments of the simulator, it is unnecessary to know the exact settings of the controls 11, 12 and 13. In some cases, however, it may be convenient to provide these controls with pointers and scales, so that the settings for given conditions can be repeated and test procedures thereby simplified.

For convenience and economy, the computing units 15, 16 and 17 are installed in the computing section of the simulator and make use of the power supply of the main computer. In a large simulator, several connector sockets may be provided, each wired in parallel to the computing units and to the computing elements of the simulator, so that the selector box may be used either in the flight deck or at a number of other convenient positions in the simulator.

What I claim is:

1. In combination with a flight training device in which aircraft attitude, altitude and airspeed are simulated, having roll angle, pitch angle, yaw angle, sideslip angle, altitude and airspeed computing systems, test apparatus for use during adjustment and maintenance operations of the flight training device, the said test apparatus comprising first computing means providing a rolling moment signal to said roll angle computing system, said roll angle computing system also having a rolling moment signal provided thereto by roll angle control means of the flight training device, second computing means providing a pitching moment signal to said pitch angle computing system, said pitch angle computing system also having a pitching moment signal provided thereto by pitch angle control means of the flight training device, third computing means providing a yawing moment signal to said yaw angle computing system, said yaw angle computing system also having a yawing moment signal provided thereto by yaw angle control means of the flight training device, and means for providing to said first and second computing means adjustably variable electrical inputs corresponding to desired simulated conditions of aircraft attitude, altitude and airspeed, the said first, second and third computing means each having a plurality of electrical inputs, one at least of each of said inputs being derived from one of the said computing systems, the magnitude of the combined signal inputs to each of the said computing means tending to become zero as the desired simulated conditions are provided, whereby the said conditions can be maintained for a prolonged period of time without the use of flying controls forming a part of the said flight training device.

2. The combination of claim 1, wherein said flight training device has means associated with the roll and pitch angle computing systems for supplying a roll rate signal and a monitor signal, proportional to the product of the cosine of the pitch angle and the sine of the roll angle, said first computing means for supplying a rolling moment signal comprising an integrating amplifier having a command signal input supplied with an adjustably variable electrical signal from a roll control, a monitor signal input supplied with said roll angle monitor signal and a stabilizing feedback signal input supplied with said roll rate signal, the said rolling moment output signal being supplied to the said roll angle computing system.

3. The combination of claim 1, wherein said flight training device has means associated with the pitch angle computing system for supplying a pitch angle signal and a sine of pitch angle signal, a second computing means for supplying a pitching moment signal comprising an integrating amplifier having a command signal input supplied with an adjustably variably electrical signal from a pitch control, a rate of change of sine of pitch angle input supplied, by way of a differentiating circuit with said sine of pitch angle signal, a monitor signal input and a stabilizing feedback signal input, the said pitching moment output signal being supplied to the said pitch angle computing system.

4. The combination of claim 3, wherein said flight training device has means associated with the airspeed system for supplying a monitor signal proportional to airspeed and a stabilizing feedback signal proportional to longitudinal acceleration, and means associated with the altitude system for supplying a monitor signal proportional to altitude and a stabilizing feedback signal proportional to rate of climb, said monitor signal and stabilizing feedback signal inputs to said integrating amplifier being supplied by way of a switch having alternative positions respectively providing said monitor and stabilizing feedback signals in one position from said altitude computing system and in the other position from said airspeed computing system.

5. The combination of claim 1, wherein said flight training device has means associated with the yaw angle computing system for supplying a yaw rate signal and means associated with the sideslip angle computing system for supplying a sideslip angle signal and a stabilizing feedback signal, said third computing means for supplying a yawing moment signal comprising an integrating amplifier having inputs supplied with said yaw rate, sideslip angle and stabilizing feedback signals, the said output yawing moment signal being supplied to the said yaw angle computing system.

6. The combination of claim 1, wherein the said means for providing adjustably variable electrical inputs include a plurality of potentiometers supplied from a source of fixed D.C. potential.

References Cited in the file of this patent

UNITED STATES PATENTS

| | | |
|---|---|---|
| 2,687,580 | Dehmel | Aug. 31, 1954 |
| 2,701,922 | Dehmel | Feb. 15, 1955 |
| 2,804,264 | Stern | Aug. 27, 1957 |
| 2,958,955 | Hunt | Nov. 8, 1960 |
| 2,986,821 | Fogarty | June 6, 1961 |
| 3,000,112 | Crabb | Sept. 19, 1961 |
| 3,011,268 | Guilloud | Dec. 5, 1961 |
| 3,026,630 | White et al. | Mar. 27, 1962 |
| 3,039,205 | Fogarty | June 19, 1962 |